(12) United States Patent
Baeuerle et al.

(10) Patent No.: US 7,934,219 B2
(45) Date of Patent: Apr. 26, 2011

(54) PROCESS AGENTS FOR PROCESS INTEGRATION

(75) Inventors: Stefan Baeuerle, Malsch (DE); Guenter Pecht-Seibert, Muehlhausen (DE); Stefan Adelmann, Mannheim (DE); Robert Getzner, Heidelberg (DE)

(73) Assignee: SAP AG, Walldorf (DE)

( * ) Notice: Subject to any disclaimer, the term of this patent is extended or adjusted under 35 U.S.C. 154(b) by 1105 days.

(21) Appl. No.: 11/319,514

(22) Filed: Dec. 29, 2005

(65) Prior Publication Data

US 2007/0185889 A1    Aug. 9, 2007

(51) Int. Cl.
G06F 3/00    (2006.01)
G06F 7/00    (2006.01)
G06F 15/16    (2006.01)

(52) U.S. Cl. ........ 719/313; 719/315; 719/317; 707/610; 709/202; 709/205

(58) Field of Classification Search ................... 711/173; 709/248; 719/319
See application file for complete search history.

(56) References Cited

U.S. PATENT DOCUMENTS

| | | | |
|---|---|---|---|
| 7,529,811 B2 * | 5/2009 | Thompson | 709/219 |
| 2003/0065827 A1 * | 4/2003 | Skufca et al. | 709/315 |
| 2003/0093479 A1 * | 5/2003 | Mellen-Garnett et al. | 709/205 |
| 2005/0055382 A1 * | 3/2005 | Ferrat et al. | 707/201 |
| 2005/0086384 A1 * | 4/2005 | Ernst | 709/248 |
| 2005/0125621 A1 * | 6/2005 | Shah | 711/173 |
| 2005/0216488 A1 * | 9/2005 | Petrov et al. | 707/100 |
| 2007/0033597 A1 * | 2/2007 | Mukundan et al. | 719/330 |

OTHER PUBLICATIONS

Rob Cutlip, Business process integration with IBM CrossWorlds, Part 1: Introduction to collaboration development, IBM, May 1, 2002, pp. 1-10.*

* cited by examiner

*Primary Examiner* — Lechi Truong
*Assistant Examiner* — Tuan Dao
(74) *Attorney, Agent, or Firm* — Kenyon & Kenyon LLP

(57) ABSTRACT

The addition of process agents into an application system allows a much simpler integration between business objects by placing the integrating components into separate, independently updateable process agents. Process agents observe business objects with which they are associated and communicate with other process agents. Alternatively, process agents may be notified by business objects to perform communication activities. Thus, a business object may be designed, operated, or updated with complete independence from the surrounding structure of the application system. The logic, application code, and integration components that require specific changes or design in response to changes in the overall application system or real world conditions are placed in the process agent objects, allowing them to be updated, modified or integrated freely without any changes to business objects within the system.

9 Claims, 3 Drawing Sheets

PROCESS AGENTS FOR PROCESS INTEGRATION

BACKGROUND

Large software applications are often composed of unmanageably large amounts of executable code. In order to facilitate creation and management of large software systems, then, the systems are often composed of many different components, including some components called business objects. Business objects are software components that may encompass user interfaces, data, business rules, communication components and any other code that may relate to their function.

In order to simplify design of these large systems, business objects are often defined as collections of logically related functions and data. A large application designed to facilitate a typical mail order business, for example, may have many different business objects. An ordering business object may be used to handle incoming orders or changes to existing orders. A shipping business object may be implemented to handle all shipping related tasks, such as arranging for deliveries or determining shipping times and costs. Business objects may handle some tasks independently while communicating with other business objects to complete other tasks.

This design model suffers from several problems however. Storing many different components all in one business object may make operation slower. Whenever one part of the business object is acting, the others may be suspended until that action is complete. Thus, if one business object communicates with another business object in order to perform a coordinated action, both business objects will be locked until that operation is complete. Users would be unable to use the objects, nor would other business objects be able to communicate with them, until the operations were completed.

When integrating business objects together, a user encounters another severe deficiency of the present state of the art. A business object cannot be designed to coordinate with every imaginable other business object, and thus some changes will have to be made to one or both of the newly integrated business objects in order to coordinate their operations. As discussed above, this leads to a shutdown and upgrade of at least one of the business objects, as well as a review of the entire inner working of the business objects in order to learn which components within them must be changed. Furthermore, changes to one business object may necessitate changes to its interface, so that all integrated business objects must be updated at the same time to account for the one new interface in the system.

Accordingly, there is a need in the art for a system that separates business objects from their frequently modified or accessed components. There is also a need for such a system to allow business objects to be integrated with other business objects or interfaces that are not known when the business objects are designed.

DETAILED DESCRIPTION

Embodiments of the present invention solve the problems discussed above by separating the relatively static components of business objects from the frequently updated and modified components, allowing piece-meal operation, upgrading and deployment of separate components previously only within business objects. The addition of process agents into an application system allows a much simpler integration between business objects by placing the integrating components into separate, independently updateable process agents. Process agents may observe business objects with which they are associated and may communicate with other process agents or interfaces. Thus, a business object may be designed, operated or updated with complete independence from the surrounding structure of the application system. The logic, application code, and integration components that require specific changes or design in response to changes in the overall application system or real world conditions are placed in the process agents, allowing them to be updated, modified or integrated freely without any changes to business objects within the system.

Figure 1:
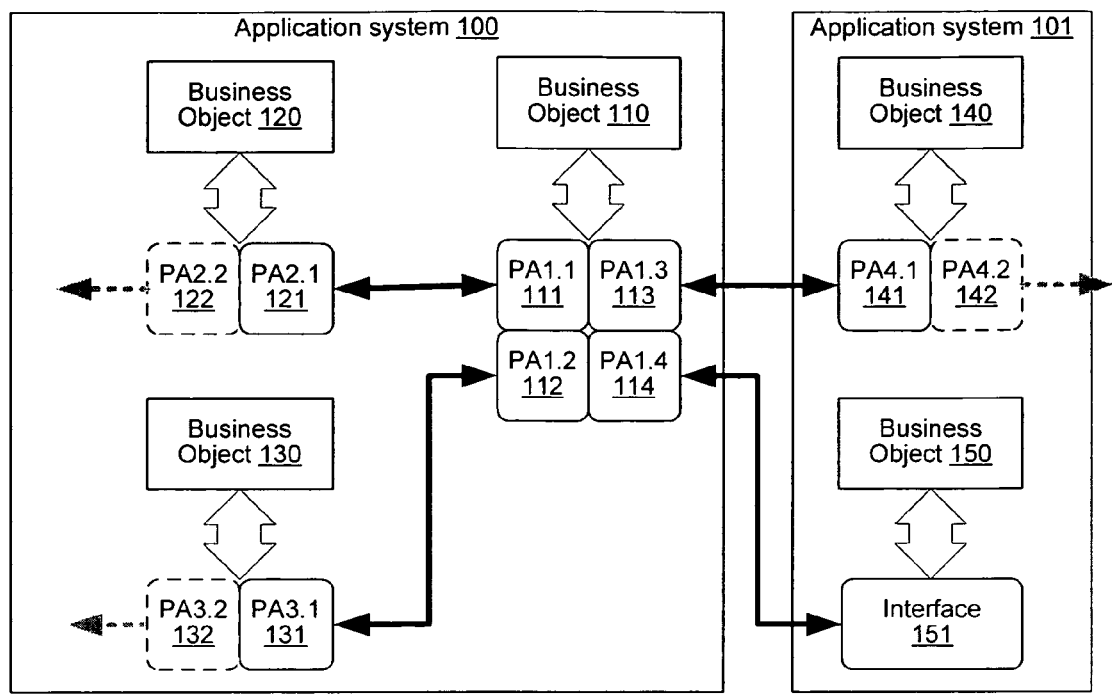
FIG. 1 shows related application systems containing business objects and process agents according to an embodiment of the invention.

FIG. 1 shows a simplified block diagram of an application system using process agents to integrate business objects. The application system of FIG. 1 shows five different business objects, business object 110, business object 120, business object 130, business object 140 and business object 150. In an example system, these business objects could each represent different functional operations performed by a company, such as product ordering, billing, inventory, human resources and accounting. A different example system could use different business objects for much smaller portions of a company's operation; this example system may use a different business object for every possible type of document or data created or used. Application systems may have any number of business objects, but for simplicity this example shows only five. Business objects may store data and business logic for a business transaction, such as a purchase order, an invoice or a product shipment. If FIG. 1 depicted the structure of an application system 100 adapted to managing a billing department, for example, one might find a business object 110 for invoices. Within the same application system 100, one might find a business object 120 for product orders placed by a customer. The application system 100 may also include another business object 140 for product shipments. Though business objects each maintain data, the application system 100 may possess certain business-related data dependencies that require integration of the business objects.

In order to communicate with other business objects, each business object may be associated with a set of process agents. A process agent is a point-to-point communication entity in an enterprise network to manage inter-process communication protocols that may be required, for example, to manage data dependencies in the network. The process agent may also be used to integrate business objects across different enterprise networks. In one embodiment, all communications between business objects may pass through two process agents. A first process agent may create and send a message relating to its own business object; this message may be received by a second process agent associated with the receiver business object. The receiving process agent then handles tasks relevant to the receiver business object based on the message from the first process agent.

FIG. 1 shows an example system according to an embodiment of the invention. In FIG. 1, application system 100 contains business object 110, which is associated with process agents PA1.1 111, PA1.2 112, PA1.3 113 and PA1.4 114. This application system is abstract, the business objects could represent any set of data, logic, or other components that embody a particular business function or data set. Business object 110 could represent invoices, for example, or product orders. Each of the associated process agents may communicate with a process agent associated with a different business object regarding the relationship between business object 110 and the other business object. In FIG. 1, for example, business object 110 is associated with process agent PA1.1 111, which is in turn associated with process agent PA2.1 121. Process agent PA2.1 121 is associated with another business object, business object 120. Process agents PA1.1 111 and PA2.1 121 may handle any communication that must take place between business object 110 and business object 120. Process agent PA1.2 112 may similarly handle communication between business object 110 and business object 130 (through process agent PA3.1 131). Other process agents may handle communication between business object 110 and business objects that are not contained within application system 100. For example, PA1.3 113 may handle communication between business object 110 and business object 140 (through PA4.1 141) even though business object 140 is contained within application system 101. PA1.4 114 may handle communication between business object 100 and business object 150 even though business object 150 is within application system 101 and uses some other interface 151 instead of a process agent. Each of these business objects may be associated with any number of process agents; for simplicity, only two process agents are shown for each of these business objects. In FIG. 1, business object 120 is thus associated with two process agents, PA2.1 121 and PA2.2 122. While PA2.1 121 is used for communications between business object 120 and business object 110, as described above, PA2.2 122 is used for communication between business object 120 and some other business object not shown. PA3.2 132 and PA4.2 142 are similarly used to communicate with business objects that are not shown. FIG. 1 is helpful in understanding the communication methods used in some embodiments of the invention. No communication needs to be passed between any of the business objects directly, allowing each business object to act as an independent repository of data. Indeed, business objects do not even need to determine the necessity of communication, as process agents monitor their associated business objects and communicate with their associated other process agent. The embodiment depicted in FIG. 1 shows that communication involving two business objects may take place between the intervening process agents. Each pair of process agents, then, may represent a path of communication regarding a particular pair of business objects.

In one embodiment, every business object has an associated process agent for each other business object. Thus, in a system such as that shown in FIG. 2 with three business objects, ordering business object 201, shipping business object 202 and billing business object 203, each business object would have two process agents (one for communication with each of the other two business objects). If a change is made to the ordering business object 201, both ordering process agents A and B, 204 and 205, would notice the change. These process agents would analyze the change to determine, based on their internal logic rules, whether the change required notifying their associated process agents, shipping process agent A 206 and billing process agent A 207, respectively. Each of those process agents, upon receiving a message, would analyze the message and determine, based on its own internal logic, whether the message warrants a change in its own business object. For example, a customer may submit an updated order to the ordering business object 201. The associated process agents may recognize that the order had changed and, depending on the nature of the change, communicate the change to a different process agent. If the order was changed to reflect different items requested, messages may be sent to the billing process agent A 207 in order to update the new amount billed and to the shipping process agent A 206 to update the items that must be sent to the customer. A change in billing address may only be conveyed to the billing process agent A 207, however, as the shipping business object 202 would not need that information. Shipping process agent B 208 and billing process agent B 209 represent a path of communication between shipping business object 202 and billing business object 203 that may be used in a manner similar to the associated pairs of process agents discussed above (process agents 205-207).

Because of the separated nature of the business objects and the process agents, the system need only be upgraded or modified in small pieces; if the system required different rules to handle how an order results in a bill, this configuration requires changes at most to the two process agents responsible for that coordination, the ordering process agent B 205 and the billing process agent A 207. Without the process agents used by embodiments of this invention, that operation would require changing the ordering business object 201 and the billing business object, making those objects unavailable for any other operations that involve those business objects.

Figure 2:
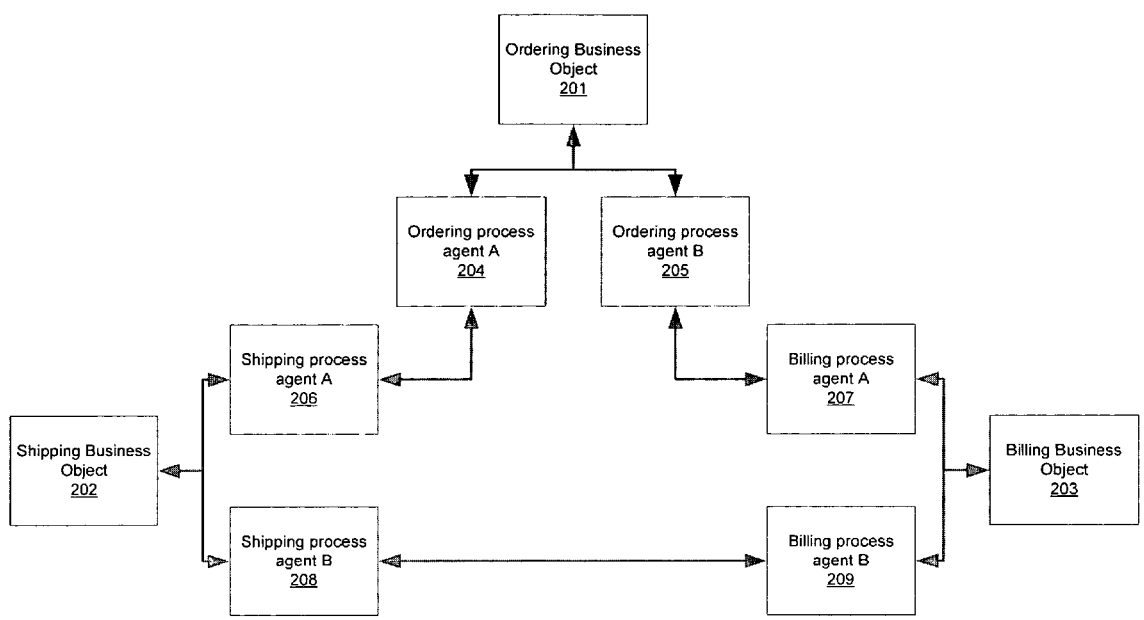
FIG. 2 shows the relationship between several example business objects and process agents according to an embodiment of the invention.
Figure 3:
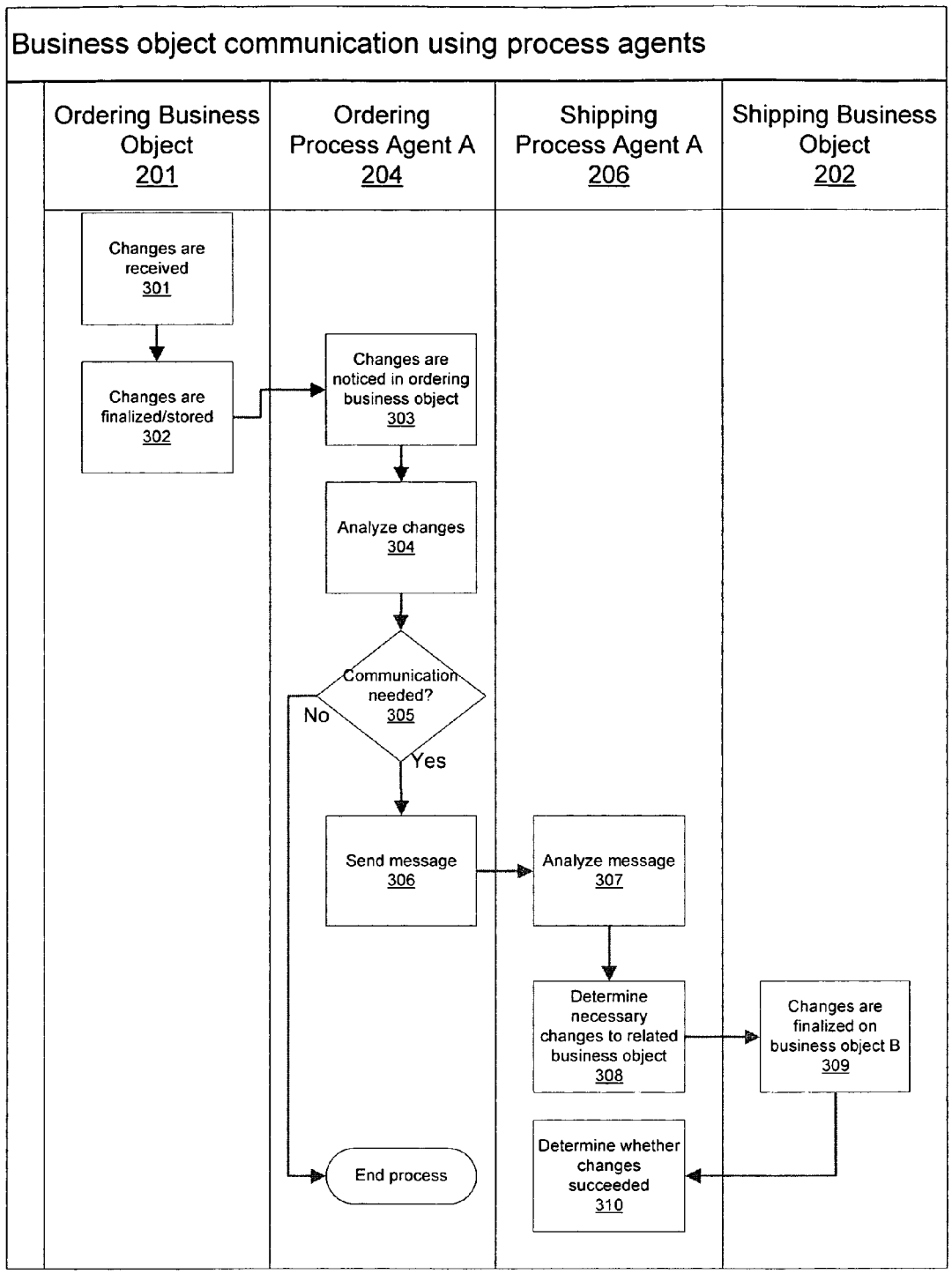
FIG. 3 shows a process flow diagram depicting the steps in an example inter-business object communication according to an embodiment of the invention.

FIG. 3 depicts an example flow chart for the embodiment of the invention shown in FIG. 2. In particular, FIG. 3 demonstrates a processing flow that involves ordering business object 201 (FIG. 2), ordering process agent A 204 (FIG. 2), shipping process agent A 206 (FIG. 2) and shipping business object 202 (FIG. 2). Changes are received by the ordering business object 201 at processing block 301. These changes could consist of a new order, a cancellation, an update of a customer's address or any other information that is related to the ordering system. These changes may then be finalized or stored in the ordering business object 201 at processing block 302. In some embodiments of the present invention, the ordering business object 201 is not required to be directly involved in the transaction. At processing block 303, the ordering process agent A 204, which may periodically examine its associated business object, the ordering business object 201, may become aware of the changes that have been finalized or stored in that business object. Alternatively, the ordering process agent A 204 may be directly notified of such changes. At processing block 304, the ordering process agent A 204 may analyze those changes to determine, at processing block 305, whether communication with its associated process agent is necessary. This analysis may be based on logic internal to ordering process agent A 204. This logic may represent data dependencies. For example, a change in the ordering business object 201 may require notification to certain business objects; the decision of whether the changes should be communicated to the other business objects is made on a case-by-case basis, with the decision to communicate the change a specific other business object made by a particular intervening process agent. If communication is not required, the ordering process agent A 204 is finished and this aspect of the task is complete. If the changes require communication, however, the ordering process agent A 204, at processing block 306, may send a message to its associated process agent, the shipping process agent A 206.

In some embodiments, the ordering business object 201 would have an associated process agent for every other business object; each of these would be responsible for analyzing changes within the ordering business object to determine whether communication with another business object was necessary. That is, after changes occur within the ordering business object 201, processing blocks 303 through 306 may be performed asynchronously by each associated process agent. Each of those process agents may be responsible for determining whether the changes are of a type that should be communicated to a particular other business object. For example, a cancellation of an order causes changes in the ordering business object 201 that may need to be communicated to shipping and billing business objects but not to a customer information business object. A change of billing address causes changes in the ordering business object 201 that may need to be communicated to the billing and customer information business objects and not to the shipping business object. Each of the process agents associated with the ordering business object 201 may thus be given different rules for the types of changes that should be communicated to other business objects.

At processing block 307, the shipping process agent A 206 may receive and analyze the message sent by the ordering process agent A 204. Based on the results of that analysis, the shipping process agent A 206 may determine the changes, if any, that should be made to its associated business object, the shipping business object 202, in processing block 308. This determination may be made based on the internal rules of shipping process agent A 206. A message conveying a change of shipping address, for example, could require a change to be made to the shipping business object 202; other messages may contain information that does not require changes to the shipping business object 202. If any changes are made, they may be finalized in processing block 309. In some embodiments, the changes are finalized by the shipping business object 202, as shown in FIG. 3. In some embodiments, the shipping process agent A 206 makes the changes itself. Embodiments of the present invention may be implemented on a machine-readable medium containing instructions for execution by one or more processors that, when executed cause the one or more processors to perform aspects of the present invention.

What is claimed is:

1. A processor-implemented method comprising:
 coupling, by an application system, a first processing agent to a first business object, the first processing agent including integrating components of the first business object, the first processing agent providing a communication path between the first business object and a second business object, and the first processing agent being independently updatable of the first business object; and
 responsive to a change in the first business object, executing a routine of:
  determining, by the first processing agent, whether the change necessitates communication to the second business object,
  when communication to the second business object is necessary, transmitting, by the first processing agent, a message to a second processing agent that is coupled to the second business object, said message including data representing the change, wherein the second processing agent includes integrating components of the second business object and the second processing agent being independently updatable of the second business object,
  determining, by the second processing agent, whether the message necessitates a second change to the second business object,
  when the second change to the second business object is necessary, effecting the second change in the second business object, and
  when the second change to the second business object is not necessary, effecting, by the second processing agent, the second change only in the second processing agent,
 wherein each business object represents a business transaction and instances of the business transaction,
 wherein the integrating components of each processing agent process the business transaction of the coupled business object, and
 wherein the first and second business object remain available for other operations in the application system during execution of the routine.

2. The processor-implemented method of claim 1, wherein determining whether the change necessitates communication to a second business object is influenced by logic within the first process agent.

3. The processor-implemented method of claim 1, wherein determining whether the message necessitates a second change to the second business object is based on at least one of the current state of the second business object, the message sent to the second processing agent, logic within the second business object and logic within the second processing agent.

4. The processor-implemented method of claim 1, wherein changes in the second business object are influenced by at least one of the current state of the second business object, the message sent to the second process agent, logic within the second business object and logic within the second processing agent.

5. The processor-implemented method of claim 1, wherein the first business object has a different coupled processing agent for each related business object.

6. A machine-readable storage medium containing instructions for execution by one or more processors that, when executed cause the one or more processors to perform:
 coupling, by an application system, a first processing agent to a first business object, the first processing agent including integrating components of the first business object, the first processing agent providing a communication path between the first business object and a second business object, and the first processing agent being independently updatable of the first business object; and
 responsive to a change in the first business object, executing a routine of:
  determining, by the first processing agent, whether the change necessitates communication to the second business object,
  when communication to the second business object is necessary, transmitting, by the first processing agent, a message to a second processing agent that is coupled to the second business object, said message including data representing the change, wherein the second processing agent includes integrating components of the second business object and the second processing agent being independently updatable of the second business object,
  determining, by the second processing agent, whether the message necessitates a second change to the second business object,
  when the second change to the second business object is necessary, effecting the second change in the second business object, and when the second change to the second business object is not necessary, effecting, by the second processing agent, the second change only in the second processing agent, wherein each business object represents a business transaction and instances of the business transaction, wherein the integrating components of each processing agent process the business transaction of the coupled business object, and wherein the first and second business object remain available for other operations in the application system during execution of the routine.

7. The machine readable storage medium of claim 6, wherein the message is influenced by at least one of logic within the first process agent and the change to the first business object.

8. The machine readable storage medium of claim 6, wherein determining changes to the second business object is influenced by at least one of logic within the second processing agent and the message from the first process agent.

9. The machine readable storage medium of claim 6, wherein the first business object has a different coupled processing agent for each related business object.

* * * * *